US006996287B1

(12) United States Patent
Weiss

(10) Patent No.: US 6,996,287 B1
(45) Date of Patent: Feb. 7, 2006

(54) METHOD AND APPARATUS FOR TEXTURE CLONING

(75) Inventor: Ben Weiss, Carpinteria, CA (US)

(73) Assignee: Adobe Systems, Inc., San Jose, CA (US)

( * ) Notice: Subject to any disclaimer, the term of this patent is extended or adjusted under 35 U.S.C. 154(b) by 692 days.

(21) Appl. No.: 10/127,906

(22) Filed: Apr. 22, 2002

Related U.S. Application Data

(60) Provisional application No. 60/285,415, filed on Apr. 20, 2001, provisional application No. 60/285,414, filed on Apr. 20, 2001.

(51) Int. Cl.
G06K 9/40 (2006.01)

(52) U.S. Cl. .................... 382/260; 382/284; 345/629; 345/582

(58) Field of Classification Search ............... 345/629, 345/582, 630; 382/260, 284
See application file for complete search history.

(56) References Cited

U.S. PATENT DOCUMENTS

| | | | | | |
|---|---|---|---|---|---|
| 5,488,674 | A | * | 1/1996 | Burt et al. | 382/284 |
| 5,555,194 | A | * | 9/1996 | Cok | 382/254 |
| 6,128,411 | A | * | 10/2000 | Knox | 382/232 |
| 6,151,029 | A | * | 11/2000 | Shirman et al. | 345/428 |
| 6,583,823 | B1 | * | 6/2003 | Shimada et al. | 348/616 |
| 6,756,989 | B1 | * | 6/2004 | Morgan et al. | 345/582 |
| 6,850,644 | B1 | * | 2/2005 | Shin et al. | 382/190 |
| 2002/0110272 | A1 | * | 8/2002 | Brodsky | 382/154 |
| 2002/0122043 | A1 | * | 9/2002 | Freeman et al. | 345/582 |
| 2003/0156758 | A1 | * | 8/2003 | Bromiley et al. | 382/219 |

OTHER PUBLICATIONS

Metherall, 2000, Project Thesis, "local segmentation of images". (pp. 1-5).*
Sannier et al., IEEE Publication, 1997, "A user friendly texture-fitting methodology for virtual humans". (pp. 167-176).*
Lee et al., IEEE Publication, 1999, "Cloning and Aging in a VR family". (pp. 61-67).*
Dayton et al., Book Publication, 2000, "Photoshop 5/5.5 Wow! Book". (pp. 199-200).*
Anil N. Hirani, et al., Combining Frequency and Spatial Domain Information for Fast Interactive Image Noise Removal, 8 pgs., Sony Corporation, Tokyo, Japan.

(Continued)

Primary Examiner—Bhavesh M. Mehta
Assistant Examiner—Manav Seth
(74) Attorney, Agent, or Firm—Park, Vaughan & Fleming, LLP

(57) ABSTRACT

Embodiments of the invention allow for cloning texture from one image location to another. The two locations may belong to the same image, or to two different images. Embodiments of the invention use a median filter to filter a source image and a target image. The filtered source image and the original source image are combined to extract texture information. Texture information is then combined with the filtered target image to generate a destination image.

Embodiments of the invention may be utilized to retouch photographs, in order to correct, improve or change localized flaws or problems in images. An example is the removal of wrinkles and blemishes on a person's face. Embodiments of the invention allow for cloning the texture from a smooth skin area into a region of wrinkles, while preserving the colors and shadings of the target image.

33 Claims, 8 Drawing Sheets

OTHER PUBLICATIONS

Homan Igehy, et al., Image Replacement Through Texture Synthesis, 4 pgs., Stanford University.

Marcelo Bertalmio, et al., Image Inpainting, 8 pgs., University of Minnesota, Universitat Pompeu Fabra.

Proceedings of the International Conference on Visualization, Image and Image Processing (VIIP 2001), Marbella, Spain. Sep. 3-5, 2001, pp. 261-266.

Kai's Photo Soap, Explorer Guide, Version 1.0, MetaTools, Inc. 1997 (e.g., "Detail Room" "Cloning" p. 31.).

Kai's Photo Soap, Clean Up Your Image, CD, 1997, MetaTools, Inc. (e.g., "Detail Room" panel; "Clone" button; click center icon (grey face), click once on main image to zoom to 1:1 resolution, click small white target on image and drag to desired source location for testure-cloning, then click and drag on the image in a seperate location, and the high-frequency texture will be transferred from the target location to the clicked location.).

* cited by examiner 770 780 790

METHOD AND APPARATUS FOR TEXTURE CLONING

This application claims the benefit of U.S. provisional application No. 60/285,415 entitled "Method and System for Cloning Textures" and filed on Apr. $20^{th}$, 2001, U.S. provisional application No. 60/285,414 entitled "Improved Median Filter" and filed on Apr. $20^{th}$, 2001, and co-pending United States Non-provisional application entitled "A method and apparatus for processing image data" and filed on Apr. $22^{nd}$, 2002 serial number to be assigned.

FIELD OF THE INVENTION

This invention relates to the field of computer technology. More specifically, the invention relates to a method and apparatus for improving image data processing.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

A common task encountered in photographic retouching involves the correction of localized flaws in images. These flaws may consist of scratches, dust, wrinkles, blemishes, or other perceived "imperfections." For example, a still-life photograph of a strawberry might exhibit all black seeds, except for a single white seed. In order to "fix" the white seed, by replacing it with a black one, a user can utilize a tool to copy an existing black seed over the white one. The graphical process of copying one area onto another is commonly referred to by those of ordinary skill in the art as "cloning".

Existing cloning tools allow a ser to correct flaws by defining a "source" location and brushing across the "destination" area. In the previous example, a user would define an area near a typical black seed and brush across the "destination" area containing the white seed. The result is a duplicate copy, or "clone," of the black seed, covering the white seed and thus providing the desired photographic result. An example of a prior art program that utilizes such a cloning tool is Adobe Photoshop™. The tool commonly referred to as the Clone Stamp provides users with the ability to duplicate one area of an image onto another area of that same image.

This image cloning technique is very powerful, and constitutes one of the workhorses of digital image retouching. However, existing clone tools have very significant limitations. For instance, current image cloning tools may sometimes copy too much information. For example, consider a photograph of a person's wrinkled face. An artist might be asked to retouch the photograph to "remove" the wrinkles, replacing them with smooth skin. Existing image cloning tools facilitate this process by "cloning" smooth areas of skin to cover the wrinkled areas, thus eliminating the wrinkles from the photograph. However, if the overall shades of the source and destination areas do not match precisely, the cloning process can create discolored blotches on the image. This limitation further reduces the effectiveness of the cloning when there are few suitable source regions that match the shade of the areas where retouching is desirable.

Another approach for retouching minor scratches, dust, and film grain within a single image uses small fixed radius smoothing filter to produce a smoothed image, from which a texture information layer is generated, of equal size to the original image. These processing steps are applied in advance to the entire image, creating a substantial delay. Straightforward cloning is then performed on the texture information layer, which is eventually re-integrated with the filtered image to produce a result image. While adequate for manipulating small-scale textures in some limited circumstances, this tool is entirely ineffective for processing larger-scale textures of the variety encountered in a modern digital image-retouching environment. Therefore, a need for a significantly more powerful and efficient texture processing apparatus is evident.

SUMMARY OF THE INVENTION

The invention described herein is a method and apparatus for cloning texture information. Embodiments of the invention allow for cloning the texture from one image (or a portion thereof) into another image (or portion thereof) or into another location of the same image. The invention contemplates various techniques for cloning textures and may accomplish such cloning by applying a blurring filter, such as a Median filter, a Gaussian filter, or any other filter that removes texture from an image, to a source image (or a portion of a source image). Upon application of the blurring filter, the filtered source image is combined with the original source image to obtain texture information. Embodiments of the invention also filter a target image. The texture information from the source image may be combined with the filtered target image to generate a destination image. The destination image, or a portion of it, retains the color and light characteristics of the source target image, and inherits the texture information of the source image.

Texture information is extracted, in accordance with an embodiment of the invention, by computing the difference between the filtered values and the original values. The difference between the original value and the filtered value is processed to extract the texture value. Extracting texture information involves computing a distance of the original value to an upper and lower range, which a user or an automatic process may define. The difference value and the distance to a range limit for each pixel are then combined to obtain the texture information in accordance with one or more transformation functions. The target image can then be filtered one or more times through a combination of one or more filters. The filtered target image is combined with the texture information to obtain a destination image.

DETAILED DESCRIPTION

A method and apparatus for extracting, cloning and transferring image texture information in a computer system is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

Figure 1:
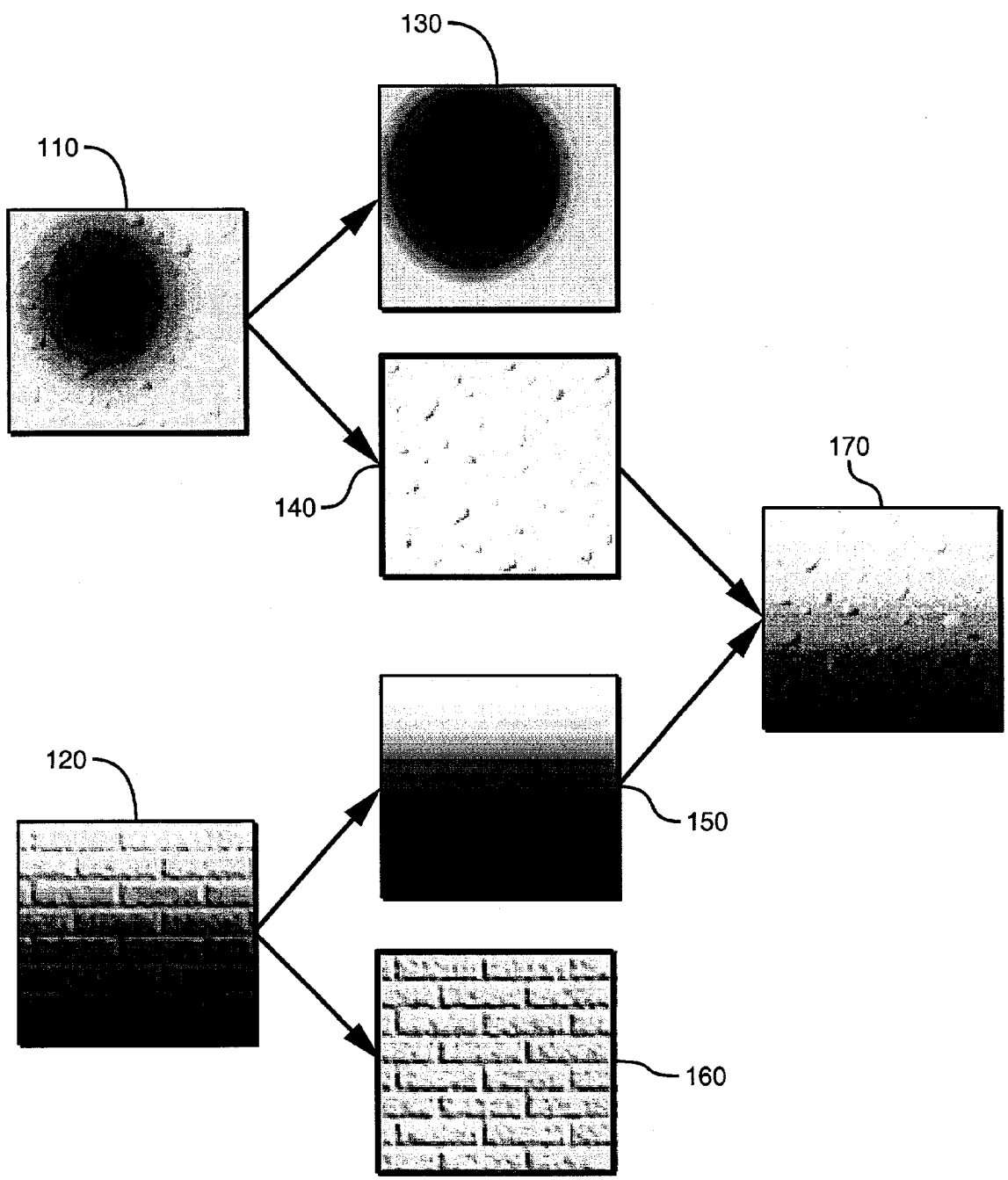
FIG. 1 illustrates the concept of cloning an image texture in accordance with embodiments of the invention.

FIG. 1 illustrates the concept of cloning an image texture in accordance with an embodiment of the invention. In the example of FIG. 1, image 110 and image 120 are processed to separate the texture information from the background information. The background information, in the context of extracting image texture, refers to image information other than texture information. Typically, in the context of embodiments for the invention, the background of an image comprises multiple aspects of image information, such as colors, shading and gradients. In some instances, the background of an image will comprise texture information that has been excluded by way of an image filter. In FIG. 1, image 110, which may be an entire image or a portion of an image, is separated into at least two components. One component of image 110 comprises the background image information 130 and another component comprises the texture information 140. The second set of image date 120, is also separated into at least two components, a background component 150 and a texture component 160. The reader should note that, if the filter used for the second image is null (e.g., a copy filter is used), the process could combine the source and target textures (as opposed to replacing the target texture with the source texture). Thus, the arbitrary-radius filter need only apply to the first image, and not the second image. Embodiments of the invention may combine background image 150, from the original image 120 and texture information 140 from a different image 110. The resulting image 170, has background information from image 120 and texture information from image 110.

In the image-processing field, a program or a device having the ability of applying any type of transformation to an image is referred to as a filter. A filter may refer to a physical lens, for example a camera lens that applies one or more physical transformations to the light traversing it. A filter may also refer to software or hardware implementing a method for transforming image data. In the latter case, the software or hardware is referred to as a "digital filter". Some digital filters are intended to digitally reproduce well-known characteristics of physical filters, such as light dimming and blurring effects. Other digital filters, or types of blurring filters, such as the median filter, do not have a physical equivalent.

Typically, image processing involves manipulating a set of image pixels in accordance with a set of general properties, such as color palettes, or in accordance with a topology. For example, in what is referred to as a Gaussian filter, each pixel, at a given location in the output image, is produced through the combination of the pixel in that location in the input image and the pixels surrounding that location. Each of surrounding pixels is weighted according to an approximate Gaussian distribution around a central pixel. Another example of "digital" filter is the median filter. The median filter selects, for a given pixel location, the pixel value that represents the statistical median (e.g., fiftieth percentile) of the region for which the pixel is at the center. Embodiments of the invention create a helper map of one or more images to be processed. The helper maps represent tiled regions of the images. When a user selects a region for processing, the helper map to process the whole region or part of the region surrounding the selected region. By processing smaller areas as needed, such embodiments of the invention avoid the time consuming step of processing the entire image in advance, thus enhancing the invention's responsiveness and speed as perceived by the user.

Figure 2:
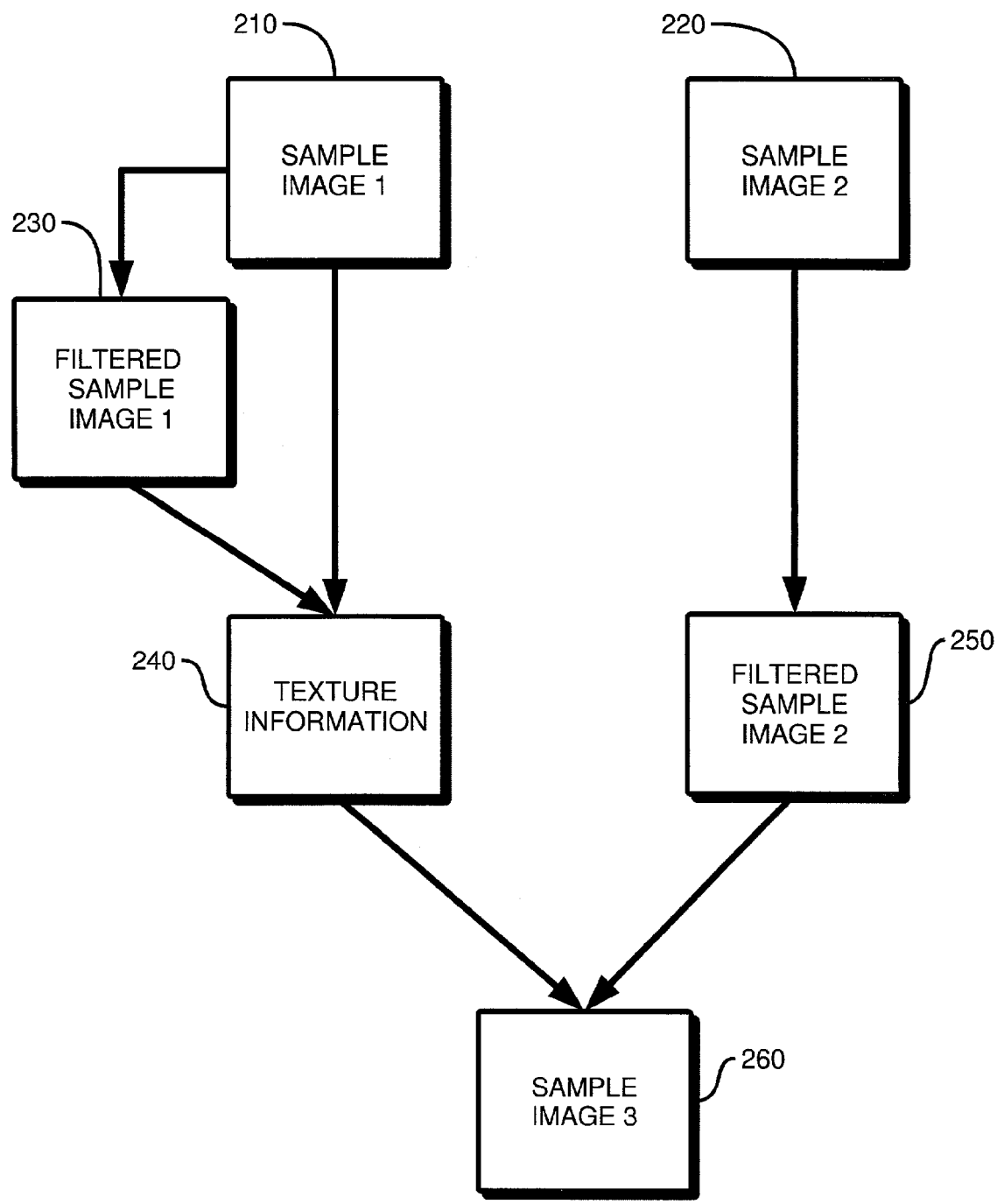
FIG. 2 is a block diagram illustrating the method for texture cloning in embodiments of the invention.

FIG. 2 is a block diagram illustrating the method for texture cloning in embodiments of the invention. A sample image, that may be an entire image of a part of an image 210, is filtered through an image filter to remove at least a part of the image texture. The image filter may refer to the same or differing types of image filters (e.g. a Median filter and a Gaussion filter). Each filter may have the same or a different radius. The terms image filter may include a single image filter or multiple image filter that can be iteratively applied against the image data.

A second sample image 220 is also processed through a texture-removing filter. Image 210 and image 220 may refer to two separate images, or two regions thereof, in embodiments of the invention. Filtering images, in embodiments of the invention, may involve applying the same image processing to both images or may involve applying different processing to both images. In other embodiments of the invention, filtering images may involve applying a filter recursively, where the filtering result of one image-processing step is used to conduct one or more further steps of image processing. For example, embodiments of the invention recursively apply a median filter to images at least twice. However, the median filter may be applied once or more than twice dependent upon the level of processing desirable. Texture information is extracted in accordance with one embodiment of the invention by combining the original sample image 210 and the filtered sample image 230. The texture information may be presented as a separate image layer to an application using an embodiment of the invention, or the texture information may be implicitly defined by the combination of source image and filtered image pixels. In the latter case, the source original image, filtered source image, and filtered target image are processed in parallel to produce destination pixels without first computing and storing the texture information. In other embodiments of the invention, texture information is computed explicitly and cached for processing image data in blocks. An embodiment of the invention treats the texture information as implicit, which can significantly improve the quality of the result.

Software programs configured to execute the invention may obtain several types of texture information by applying one or more filters to an image. For example, such programs may extract only the luminance from the image data, instead of the color channels as in the Red-Green-Blue color scheme. Embodiments of the invention may display the results of several image filtering techniques and allow a user to select, from a menu, the filter that is to be used to carry out further processing steps. Texture information 240 and background information 250 can be combined to generate a target image 260.

Figure 3:
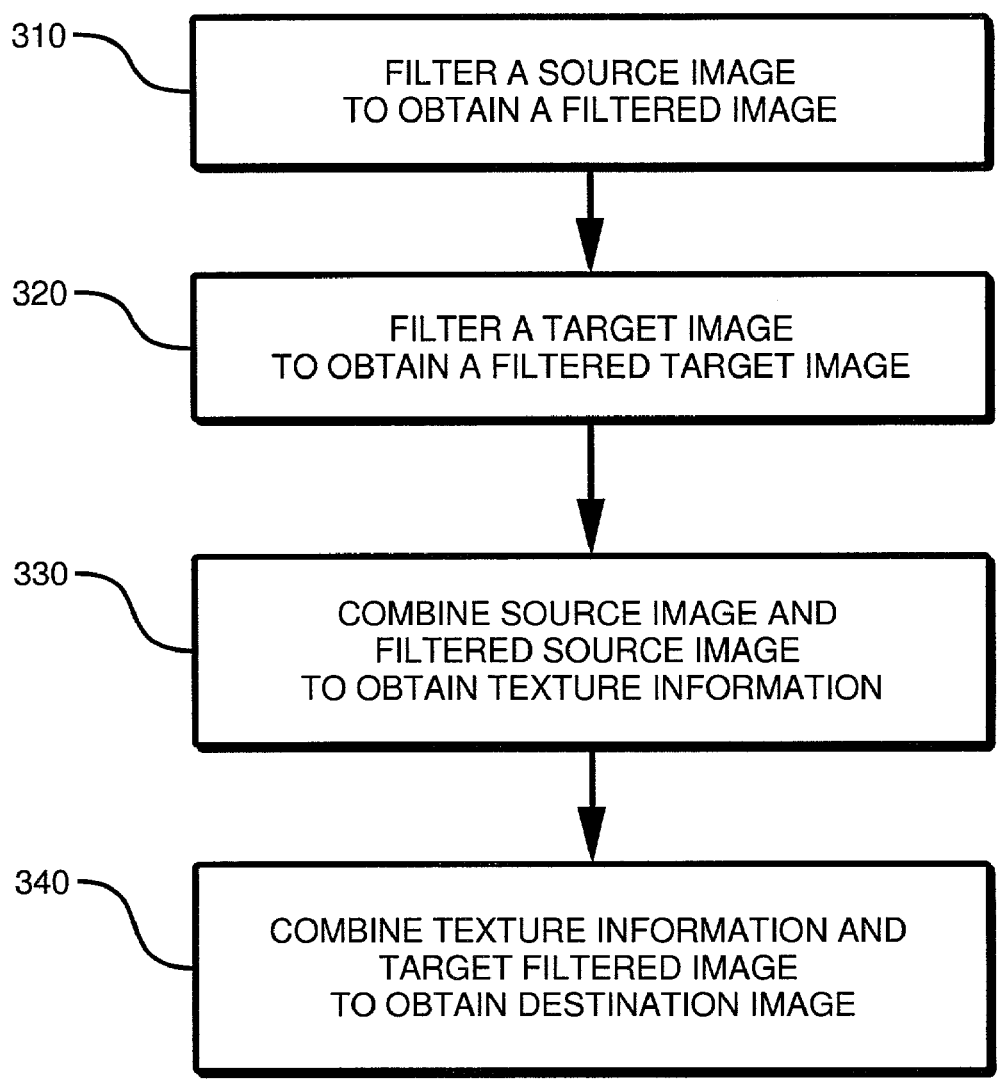
FIG. 3 is a flowchart illustrating steps for performing texture information cloning in accordance with embodiments of the invention.

FIG. 3 is a flowchart illustrating the steps for performing texture information cloning in accordance with embodiments of the invention. The process initiates by obtaining a first set of filtered image data and applying at least one image filter (which may have an arbitrary or user-defined radius) to a first source image at step 310. The filtered target image is obtained by filtering a target image at step 320. At step 330 the source image and the filtered source image is combined to obtain texture information. Finally, at step 340, the texture information is combined with the background information to generate a destination image. Typically, the destination image comprises an entire image or only a portion of an image. The two different images are processed and the system implementing embodiments of the invention may clone the texture from a source image into a target image by replacing the portion of the image for which the processing was conducted. Users may select a source location within an image and a destination location within the same or different image. The process of cloning the texture in these instances may be carried out transparently to the user so that the user does not see the outcome of each step of the processing and only sees the results. In other embodiments of the invention, the user may intervene and interact during result processing. For example, the user may select, in addition to the location where the processing to be conducted, the number of filters, their type and size, the sequence of filters in the case of multiple filters, the color channels, and the number of iterations to be conducted for an image or portion of an image. The user may then review the texture information results obtained by each filter application and select the step or group of steps to use in further processing.

In an embodiment of the invention, a user employs a paintbrush metaphor to interactively define the source and destination regions to be cloned. This is done by first selecting a source location in the first image, then clicking on a target location in the second image and dragging to paint a region. As the user brushstroke progresses, it becomes desirable to display intermediate results of the texture-cloning operation, which can be made efficient by processing only the areas that have changed from one displayed frame to the next. Further efficiency may be obtained by observing that the image-filtering steps (steps 310 and 320 in FIG. 3) need only be performed once on a given sub-region of the source and target images, and the results may be cached and re-used in later processing involving those regions. Furthermore, if these sub-regions are filtered on an as-needed basis, as opposed to filtering the entire images in advance, any delay experienced by the user while using the invention may be substantially reduced or eliminated. In one embodiment of the invention, the source and target images are logically divided into a grid rectangular subregions, and the first time any filtered data from a particular subregion is required (by steps 330/340 in FIG. 3), that entire subregion is immediately filtered and the results cached for future use.

Figure 4A:
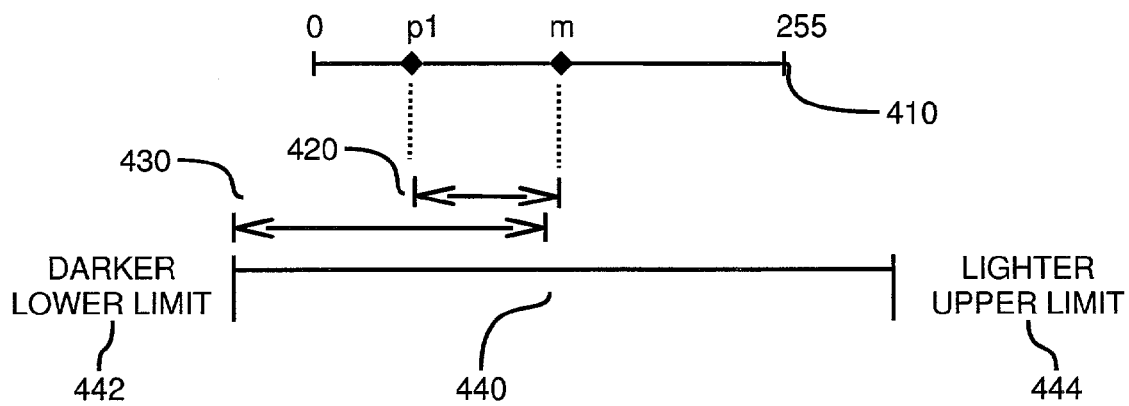
FIG. 4A and FIG. 4B are block diagrams illustrating a method for extracting texture information in accordance with embodiments of the invention.
Figure 4B:
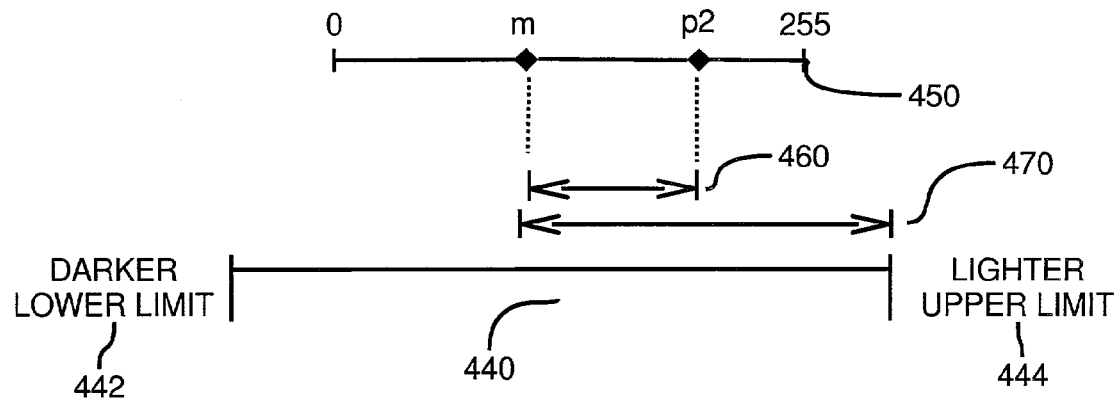

FIG. 4A and FIG. 4B are block diagrams illustrating a method for extracting texture information in accordance with embodiments of the invention. Image pixels, denoted by pi and p2, are represented within a scale of resolution. For example, in an eight-bit resolution scheme, pixels may have data value in a representation between data value zero (0) and data value two hundred fifty five (255), where the latter values are indicated by 410 and 450 in the Figure. FIG. 4A represents a case where the value "m", that is the outcome of filtering an area corresponding to a pixel "pi", is greater that the value of the pixel "pi". In other terms, the purpose of filtering is to remove texture information. The texture information, in this instance, is found to lower the pixel's value, causing darkening of the pixel. Referring to FIG. 4A, embodiments of the invention use the difference 420 between the pixel "pi" and its corresponding filtered value, "m", and the difference 430 between the filtered value, "m", and a lower limit 442 to compute texture information. In one embodiment of the invention the lower limit is arbitrarily set to a value that is less than the minimum value of the pixel representation scheme (e.g. –45). Other embodiments of the invention compute the range 440 in FIG. 4A to obtain texture information according to one or more criteria. For example, the computation of range 440 may take into account the properties of visual perception of colors and/or gradients in an image. Embodiments of the invention utilize the differences 420 and 430 to compute texture information that can be applied to a different image. For example, the ratio of 420 over 430 may be used to represent the percent variation that should be applied to a given pixel to reflect the texture information on that particular pixel. Other embodiments of the invention may use other formulae to represent texture information.

FIG. 4B represents an example where the value of the filtered pixel "m" is lower than the value of the initial pixel "p2". In this example, the texture information may be thought of as having a lightening effect on the pixel. In embodiments of the invention, when the filtered value is found to be lower that the original pixel value, a difference is computed in relation to an upper limit 444 in a representation range 440. As in the case of the lower limit 442, the upper limit 444 may be computed in several ways, comprising choosing an arbitrary upper limit value. Embodiments of the invention may use different range representations (e.g. 440) depending on the image property (e.g., one or more color channels, luminance etc.) that is considered for texture computation. The differences 460 and 470 are combined to compute texture information. Embodiments of the invention compute a simple ratio of 460 over 470 to represent the percent variation towards the upper limit. To add texture information, the percent ratio is combined with a target pixel to produce a pixel that has the texture information.

Figure 5:
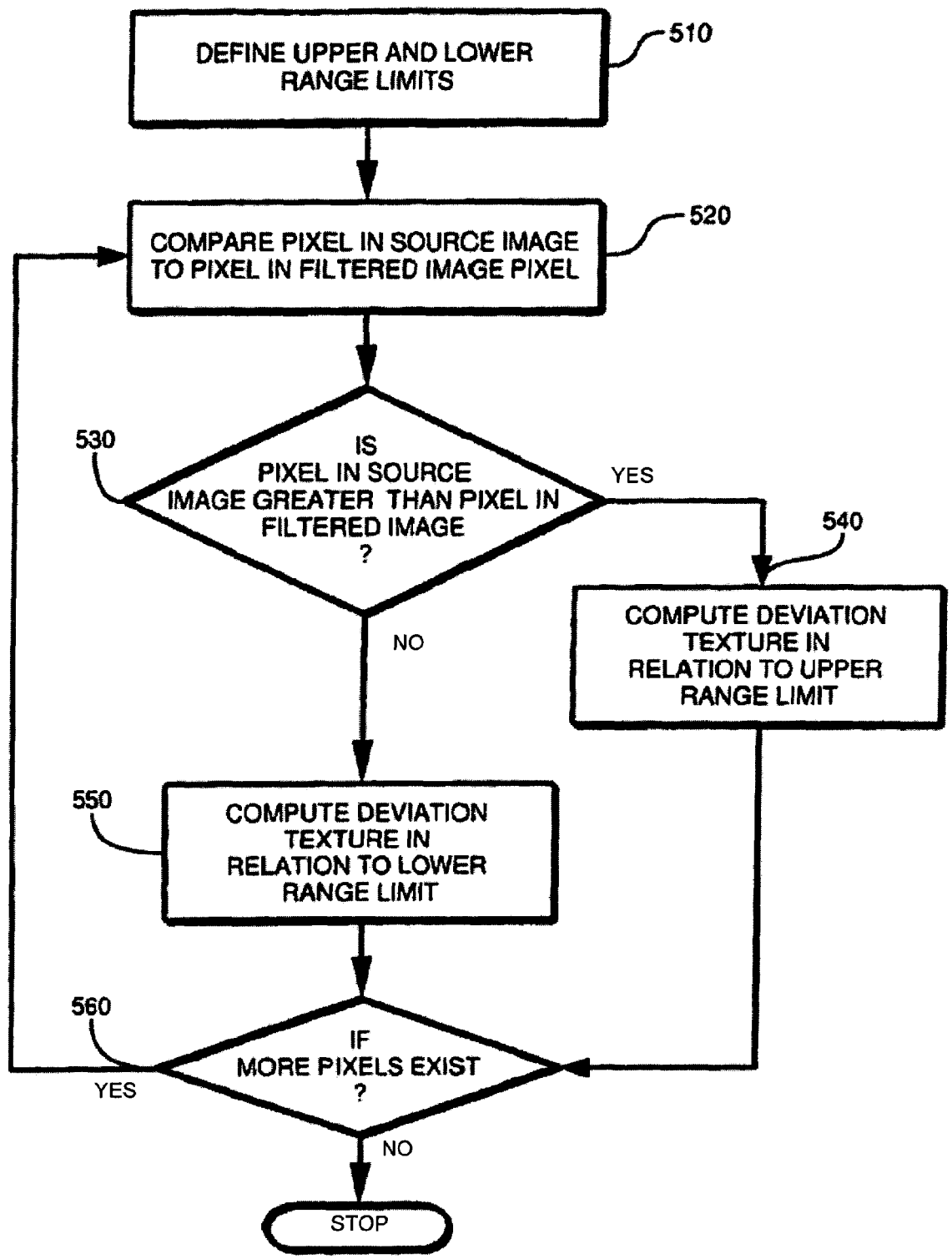
FIG. 5 is a flowchart diagram that illustrates the method steps involved in extracting texture information in embodiments of the invention.

FIG. 5 is a flowchart diagram illustrating the steps involved in extracting texture information in embodiments of the invention. At step 510, embodiments of the invention define upper and lower range limits to represent pixel texture information. In an eight-bit representation (256 levels of resolution), the lowest value of a pixel is zero (0) and highest value is 255. In one embodiment of the invention, with image using eight-bit pixel representation, the lower limit may be set to "–45" and the upper range limit is set to "300". The lower and upper range limits are set to efficiently allow transfer of texture from one segment of range to another. At 520, embodiments of the invention compare the source image pixel values to the filtered image pixel values. The comparison may involve any pixel data in any image representation utilizing an identifiable colorspace. For instance, the comparison can operate in colorspaces such as RGB, HSV, LAB, CMYK, or any other identifiable colorspace. If the source pixel values exceed the filtered pixel values at step 530, then embodiments of the invention compute a deviation texture value in comparison to the upper range limit for texture information, at step 540. Otherwise, embodiments of the invention choose to calculate the deviation texture in relation to the lower range limit at step 550.

As an example of this procedure, suppose a texture darkens a pixel in a gray scale representation, with a source pixel value of 216 and a filtered pixel value of 245 in a pixel representation with 256 levels of resolution, using a lower limit of −45. The texture information, in embodiments of the invention, would be (216+45)/(245+45)=0.9. Suppose that a target pixel is much darker than the source pixel with a value of 20. An embodiment of the invention would compute a destination pixel with a value of (20*0.9)=18, where "*" indicates a multiplication operation. In embodiments of the invention, the texture information takes into account the magnitude of the changes applied to a target pixel.

At step 560, embodiments of the invention follow an iterative process to cover the pixels within the area concerned with the texture extraction and cloning. In an embodiment of the invention, a median filter is used to process both the source and the target image data. The method utilized for processing image data is discussed in another patent application (serial number: to be determined), which is included herein by reference. In an embodiment of the invention, the median filter is recursively applied at least twice.

Figure 6:
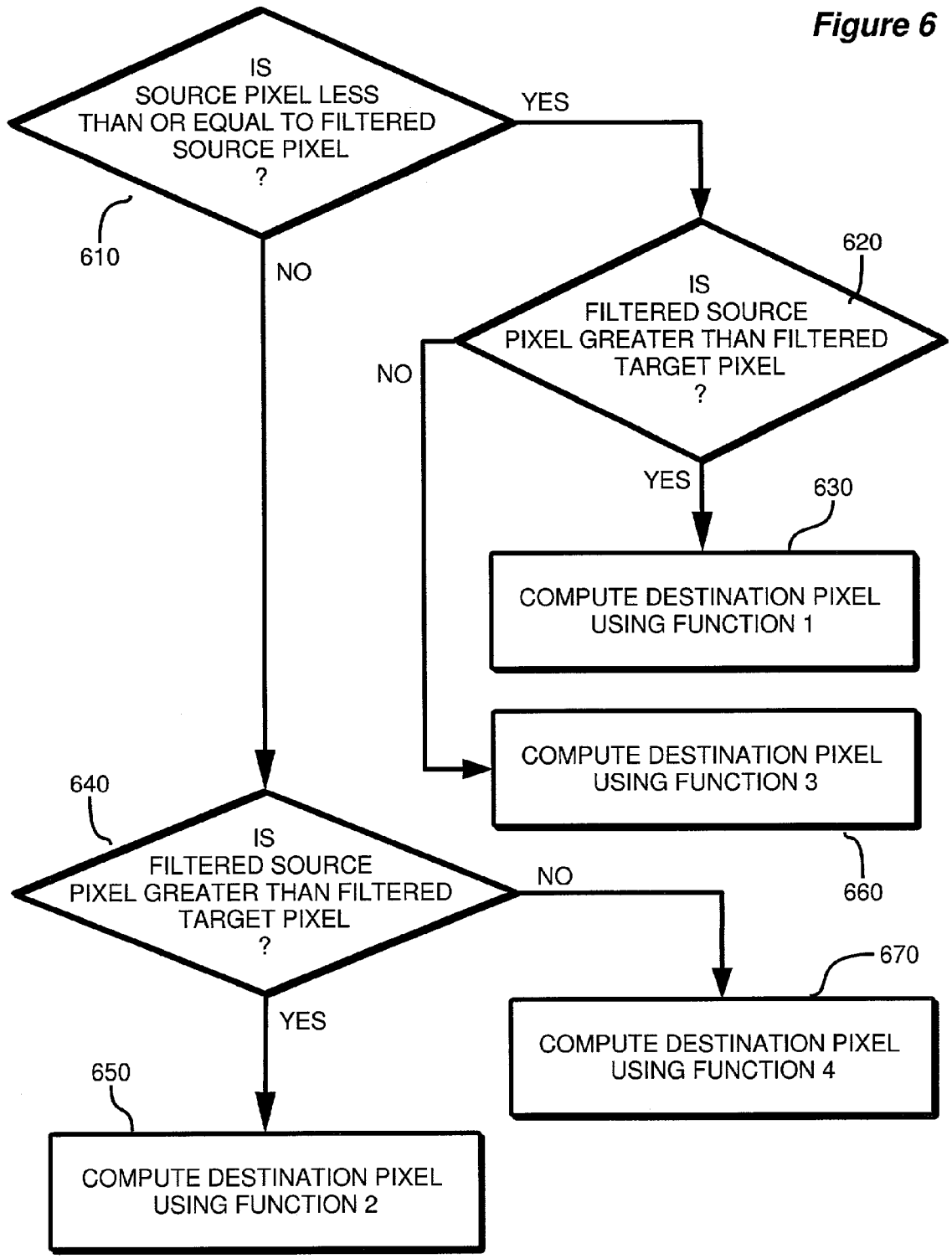
FIG. 6 is a flowchart illustrating the method steps for merging texture information for generating destination images in embodiments of the invention.

FIG. 6 is a flowchart illustrating the method for merging texture information to generate destination images, in embodiments of the invention. Once the texture information is extracted, embodiments of the invention apply one or more method steps to merge texture information with information from the target image to generate the destination image. The method steps for merging texture information may involve transforming the texture data according to the source, the filtered source, filter target and target pixel values. At step 610 one embodiment of the invention compares the source pixel to the filtered source pixel. If the filtered source pixel value is less than or equal to the value of the source pixel, then the filtered source pixel value is compared to the filtered target pixel value at step 620. If the filtered source pixel value is greater than the filtered target pixel value, the texture information is merged with the filtered target pixel value using a transformation function at step 630. Otherwise, a different transformation function is applied at step 660. A transformation function may be any mathematical function that takes the pixel values as input and is designed to combine the input into a value that best reflects the texture information when merged with a target image. Embodiments of the invention implement transformation functions that account for one or more lighting properties and color combinations. Examples of such transformation functions comprise functions where the destination value is the product of the filtered target pixel value and a function of the quotient of the source pixel value and the filtered source pixel value.

At step 640, embodiments of the invention compare the filtered source pixel value and the filtered target pixel value. If the filtered source pixel value is greater than filtered target pixel value, embodiments of the invention apply another function, function 2, to merge the texture information with the filtered target pixel value at step 650. Otherwise, embodiments of the invention apply a fourth function, function 4, to merge texture information with the filtered target pixel value at step 660. Embodiments of the invention may utilize some transformation functions (e.g., function 3) in more than one situation to merge texture information with filtered target pixels values. For example, transformation functions 3 and 4 may be the same functions. Examples of transformation functions employed in embodiments of the invention are indicated below, where D is the destination pixel, S is the source pixel, Fs is the filtered source pixel and Ft is the filtered target pixel (all with an 8-bit range of values from 0 to 255):

$$D = Ft \times (S/Fs)$$

and $$D = 384 - [(384 - Ft) \times ((384 - S)/(384 - Fs))]$$

Figure 7A:
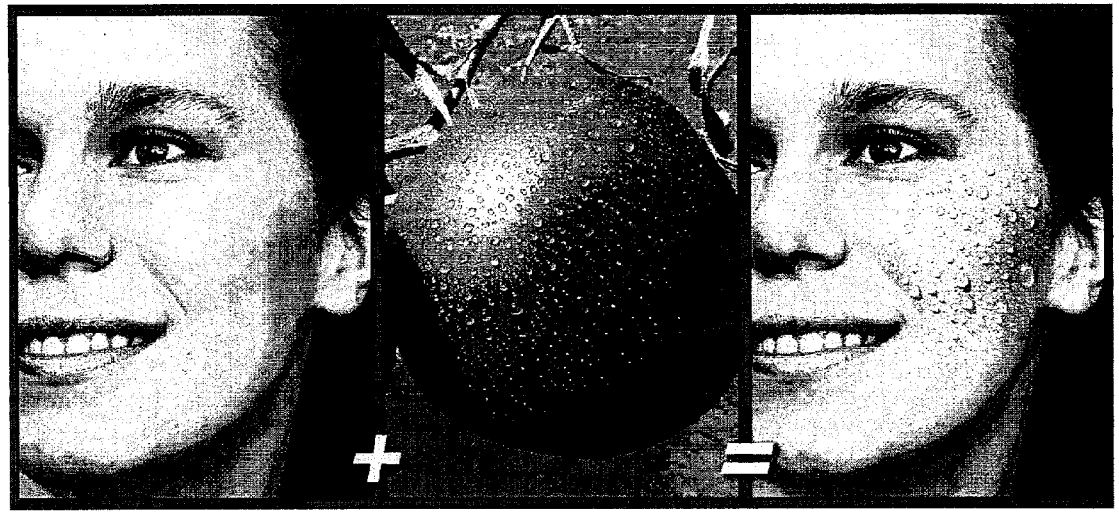
FIGS. 7A, 7B, and 7C are pictures that illustrate the results of cloning texture using embodiments of the invention.
Figure 7B:
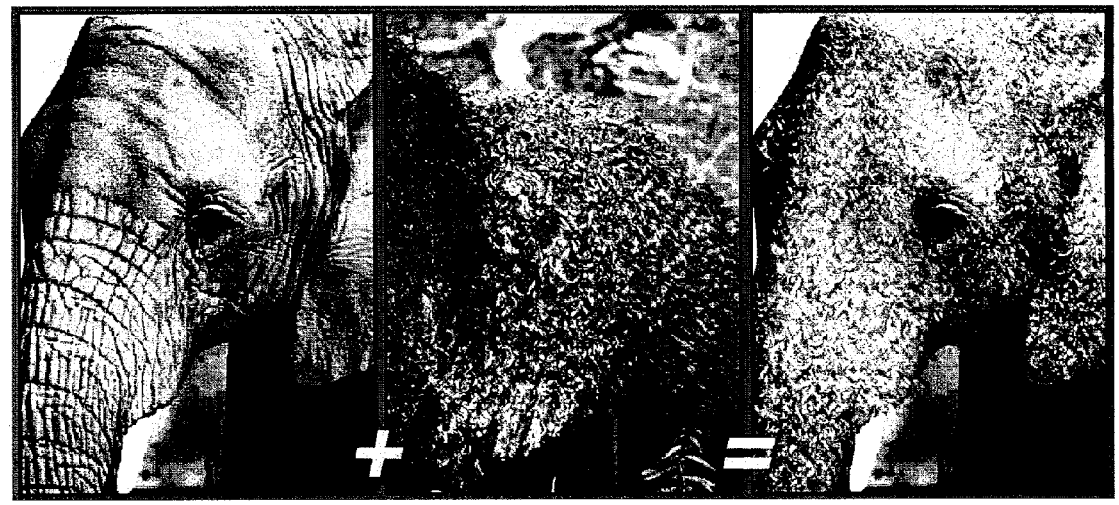
Figure 7C:
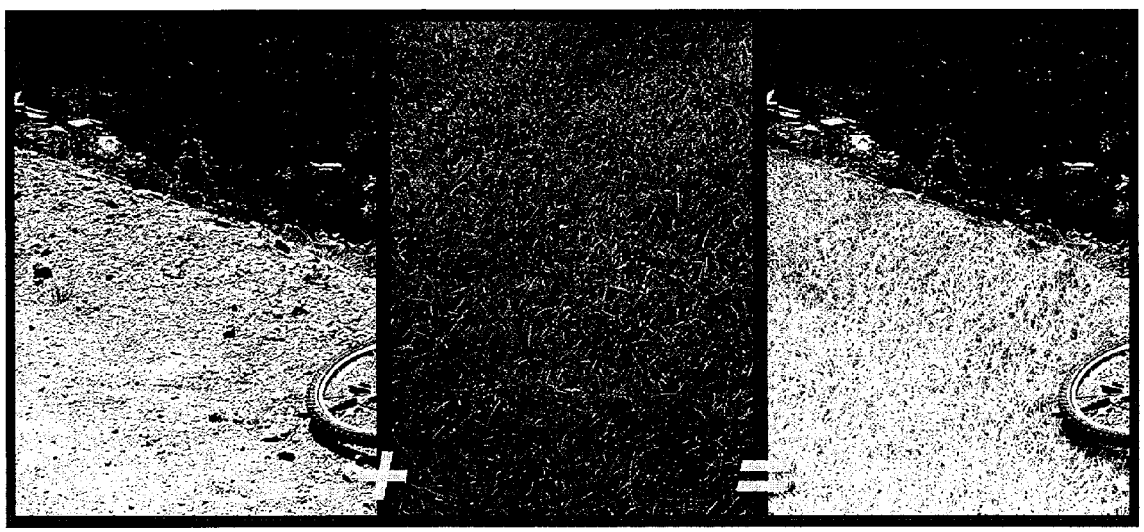

FIGS. 7A, 7B, and 7C are contain that illustrate the results of cloning texture using embodiments of the invention. FIG. 7A depicts a picture of a girl 710, a picture of a tomato 720 and a third picture 730 generated by an embodiment of the invention. In FIG. 7A the picture depicting the tomato 720 is the source image, and the one depicting the girl 710 is the target image. Picture 730 is the destination image. An embodiment of the invention processes both pictures 710 and 720 recursively twice through a median filter. Next, the texture at a specific location in the filtered source image is computed and combined with the filtered target image to generate the destination image or a portion of the destination image. One can clearly see that the destination image (in the gray scale representation) keeps the color shadings from the target image, while the texture, consisting of water drops, has been extracted from the source image and superimposed on the color shadings to produce the destination image.

In FIG. 7A the tomato picture offers little texture, since the surface of the tomato is smooth. FIG. 7B illustrates a texture replacement in a target image. Picture 740 depicts an elephant and picture 750 depicts a portion of a sheep. The skin of the elephant shows a texture in addition to color shadings. Using an embodiment of the invention, texture information is extracted from the sheep's fleece and replaces the elephant's skin texture in the destination picture 760. In this example, the embodiment of the invention utilizes a median filter executed once. However, the median filter could be recursively run two or more times on each of the source and target images.

FIG. 7C illustrates embodiments of the invention processing complex situations for substituting texture information in a destination image, while preserving color and shading characteristics. Picture 770 and 780 depicts two different natural scenes as may be typically taken with a photographic camera. In the example of FIG. 7C, picture 770, showing an image of the ground, is the target image and picture 780, showing an image of grass, is the source image. An embodiment of the invention generates a destination image 790, where a portion of the ground image is substituted with the texture of the grass from the source image 780.

Some of the most valuable applications for which embodiments of the invention may be used are in artistic design and photography. For example, in retouching a person's photos, an artist may "remove" wrinkles on the face by replacing them with a smooth skin texture. Embodiments of the invention facilitate this process by "cloning" smooth areas of skin to cover the wrinkled areas, thus eliminating the wrinkles from the photograph. In embodiments of the invention, the shades of the source and destination areas do not have to match precisely for the texture cloning process to work successfully.

Thus, a method and apparatus for cloning texture information between a source image and a target image, while preserving the shading and colors of the target image, has been described.

What is claimed is:

1. In a computer system, a method for performing texture cloning for images, comprising:

obtaining a first set of filtered image data by applying at least one arbitrary-radius image filter to a first set of image data, wherein said applying said at least one arbitrary-radius image filter comprises removing one or more aspects of image texture;

obtaining a second set of filtered image data by applying said at least one arbitrary-radius image filter to a second set of image data;

obtaining a texture information data by combining said first set of image data with said first set of filtered image data; and, obtaining a destination image by combining said texture information data with said a second set of filtered image data;

wherein said combining said first set of image data with said first set of filtered image data further comprises computing a deviation value between an upper limit value and lower limit value;

wherein the upper limit value is set above a maximum value for an element of said first set of image data and the lower limit value is set below a minimum value for the element of said first set of image data; and wherein combining said texture information data with said second set of filtered image data involves applying a ratio of the deviation to said upper limit value and lower limit value to the filtered image data.

2. The method of claim 1, wherein said first set of image data further comprises at least a portion of said first set of image data.

3. The method of claim 1, wherein said second set of image data further comprises at least a portion of said second set of image data.

4. The method of claim 1, wherein said at least one arbitrary-radius image filter further comprises a median filter.

5. The method of claim 1, wherein said at least one arbitrary-radius image filter further comprises a blurring filter.

6. The method of claim 1, wherein said at least one arbitrary-radius image filter further comprises a Gaussian filter.

7. The method of claim 1, wherein said at least one arbitrary-radius image filter further comprises a harmonic mean filter.

8. The method of claim 1, wherein said applying said at least one arbitrary-radius image filter further comprises recursively applying said at least one arbitrary-radius image filter at least twice.

9. The method of claim 1, wherein said applying said at least one arbitrary-radius image filter further comprises applying a filter that removes at least one texture component.

10. The method of claim 1, wherein said applying said at least one arbitrary-radius image filter further comprises applying a filter that removes high spatial frequencies.

11. The method of claim 1, wherein said combining said first set of image data with said first set of filtered image data further comprises computing a deviation value for each pixel between said first set of image data and said first set of filtered image data.

12. The method of claim 1, wherein said combining said first set of image data with said first set of filtered image data further comprises computing a deviation value between within a set range of values.

13. The method of claim 1, wherein said texture information data further comprises at least one color channel.

14. The method of claim 1, wherein said obtaining texture information data comprising:

computing for each pixel in said first set of image data, the difference with a corresponding pixel in said filtered first set of image data;

obtaining a distance of said each pixel in said first set of image data to a range limit and said each pixel in said filtered first set of image data; and computing said texture information through a transformation function utilizing said difference and said distance.

15. A computer program product comprising:

a computer readable medium having computer readable program code embodied therein, said computer readable program code configured to:

obtain a first set of filtered image data by applying at least one arbitrary-radius image filter to a first set of image data, wherein said applying said at least one arbitrary-radius image filter comprises removing one or more aspects of image texture;

obtain a second set of filtered image data by applying said at least one arbitrary-radius image filter to a second set of image data;

obtain a texture information data by combining said first set of image data with said first set of filtered image data; and obtain a destination image by combining said texture information data with said a second set of filtered image data;

wherein said combining said first set of image data with said first set of filtered image data further comprises computing a deviation value between an upper limit value and lower limit value;

wherein the upper limit value is set above a maximum value for an element of said first set of image data and the lower limit value is set below a minimum value for the element of said first set of image data; and wherein combining said texture information data with said second set of filtered image data involves applying a ratio of the deviation to said upper limit value and lower limit value to the filtered image data.

16. The computer program product of claim 15, wherein said first set of image data further comprises at least a portion of said first set of image data.

17. The computer program product of claim 15, wherein said second set of image data further comprises at least a portion of said second set of image data.

18. The computer program product of claim 15, wherein said at least one arbitrary-radius image filter further comprises a median filter.

19. The computer program product of claim 15, wherein said at least one arbitrary-radius image filter further comprises a blurring filter.

20. The computer program product of claim 15, wherein said at least one arbitrary-radius image filter further comprises a Gaussian filter.

21. The computer program product of claim 15, wherein said at least one arbitrary-radius image filter further comprises a harmonic mean filter.

22. The computer program product of claim 15, wherein said applying said at least one arbitrary-radius image filter further comprises recursively applying said at least one arbitrary-radius image filter at least twice.

23. The computer program product of claim 15, wherein said applying said at least one arbitrary-radius image filter further comprises applying a filter that removes at least one texture component.

24. The computer program product of claim 15, wherein said applying said at least one arbitrary-radius image filter further comprises applying a filter that removes high spatial frequencies.

25. The computer program product of claim 15, wherein said combining said first set of image data with said first set of filtered image data further comprises computing a deviation value for each pixel between said first set of image data and said first set of filtered image data.

26. The computer program product of claim 15, wherein said combining said first set of image data with said first set of filtered image data further comprises computing a deviation value between within a set range of values.

27. The computer program product of claim 15, wherein said texture information data further comprises at least one color channel.

28. The computer program product of claim 15, wherein said texture information data further comprises data obtained from an intermediate computation step.

29. The computer program product of claim 15, wherein said texture information data further comprises texture data stored in a computer.

30. The computer program product of claim 15, wherein obtaining said texture information data further comprises computer program product code configured to:
   compute for each pixel in said first set of image data, the difference with a corresponding pixel in said filtered first set of image data;
   obtain a distance of said each pixel in said first set of image data to a range limit and said each pixel in said filtered first set of image data; and
   compute said texture information data through a transformation function utilizing said difference and said distance.

31. In a computer system, a method for performing texture cloning for images, comprising:
   obtaining a first set of filtered image data by applying at least one image filter to a first set of image data, wherein said applying said at least one image filter comprises removing one or more aspects of image texture;
   obtaining a second set of filtered image data by applying said at least one image filter to a second set of image data;
   obtaining texture information data by combining said first set of image data with said first set of filtered image data, wherein said texture information data comprises a larger quantity of data per pixel than said first set of image data; and,
   obtaining a destination image by combining said texture information data with said a second set of filtered image data;
   wherein said combining said first set of image data with said first set of filtered image data further comprises computing a deviation value between an upper limit value and lower limit value;
   wherein the upper limit value is set above a maximum value for an element of said first set of image data and the lower limit value is set below a minimum value for the element of said first set of image data; and
   wherein combining said texture information data with said second set of filtered image data involves applying a ratio of the deviation to said upper limit value and lower limit value to the filtered image data.

32. In a computer system, a method for performing texture cloning for images, comprising:
   obtaining a first set of filtered image data by applying at least one user-defined radius image filter to a first set of image data, wherein said applying said at least one user-defined image filter comprises removing one or more aspects of image texture;
   obtaining a second set of filtered image data by applying said at least one user defined radius image filter to a second set of image data;
   obtaining texture information data by combining said first set of image data with said first set of filtered image data, wherein said texture information data comprises a larger quantity of data per pixel than said first set of image data; and,
   obtaining a destination image by combining said texture information data with said a second set of filtered image data;
   wherein said combining said first set of image data with said first set of filtered image data further comprises computing a deviation value between an upper limit value and lower limit value;
   wherein the upper limit value is set above a maximum value for an element of said first set of image data and the lower limit value is set below a minimum value for the element of said first set of image data; and
   wherein combining said texture information data with said second set of filtered image data involves applying a ratio of the deviation to said upper limit value and lower limit value to the filtered image data.

33. In a computer system, a method for performing texture cloning for images, comprising:
   obtaining a first filtered set of image data by applying at least one texture removal filter to a first set of image data;
   obtaining a second set of filtered image data by applying said at least one texture removal filter to a second set of image data;
   obtaining a destination set of image data by combining said first set of image data, said first filtered set of image data, and said second filtered set of image data;
   wherein said combining said first set of image data with said first set of filtered image data further comprises computing a deviation value between an upper limit value and lower limit value;
   wherein the upper limit value is set above a maximum value for an element of said first set of image data and the lower limit value is set below a minimum value for the element of said first set of image data; and
   wherein combining said texture information data with said second set of filtered image data involves applying a ratio of the deviation to said upper limit value and lower limit value to the filtered image data.

* * * * *